(12) United States Patent
Sturm

(10) Patent No.: US 6,808,139 B1
(45) Date of Patent: Oct. 26, 2004

(54) GUIDANCE FOR MISSLE SYSTEMS WITH TARGET TRACKER AND ADDITIONAL MANUAL TRACK POINT CORRECTION

(75) Inventor: Richard Sturm, Ottobrunn (DE)

(73) Assignee: Daimler-Benz Aerospace AG, München (DE)

( * ) Notice: Subject to any disclaimer, the term of this patent is extended or adjusted under 35 U.S.C. 154(b) by 1387 days.

(21) Appl. No.: 08/980,004

(22) Filed: Nov. 26, 1997

(30) Foreign Application Priority Data

Nov. 30, 1996 (DE) .......................... 196 49 735

(51) Int. Cl.[7] .............................................. F41G 7/00
(52) U.S. Cl. .................... 244/3.11; 244/3.13; 244/3.14; 342/61; 342/62
(58) Field of Search ............................ 244/3.11–3.19, 244/3.2, 3.21, 3.22, 3.1; 342/52–55, 58, 61–68

(56) References Cited

U.S. PATENT DOCUMENTS

| | | | | |
|---|---|---|---|---|
| 3,876,308 A | * | 4/1975 | Alpers | .................. 244/3.16 X |
| 4,027,837 A | * | 6/1977 | Miller, Jr. et al. | ......... 244/3.16 |
| 4,047,678 A | * | 9/1977 | Miller, Jr. et al. | ......... 244/3.16 |

* cited by examiner

Primary Examiner—Bernarr E. Gregory
(74) Attorney, Agent, or Firm—McGlew and Tuttle, P.C.

(57) ABSTRACT

A guidance method for guidance systems is disclosed. The method includes forming a target track point with a target tracker. The method corrects the track point with a manual correction signal. A speed of rotation of the line of sight is determined with the target tracker. A track control system dynamic model is provided for forming an estimated value for the rotation speed of the line of sight. The estimated value for the rotation speed of the line of sight is formed from the determined speed of rotation of a line of sight corrected with a correction value generated with the dynamic model of the track control circuit based on the manual correction signal. The estimated value of the speed of rotation of the line of sight is then used for guidance.

14 Claims, 8 Drawing Sheets

Guidance observer for estimating the speed of rotation of the line of sight for guidance with manually corrigible target trackers.

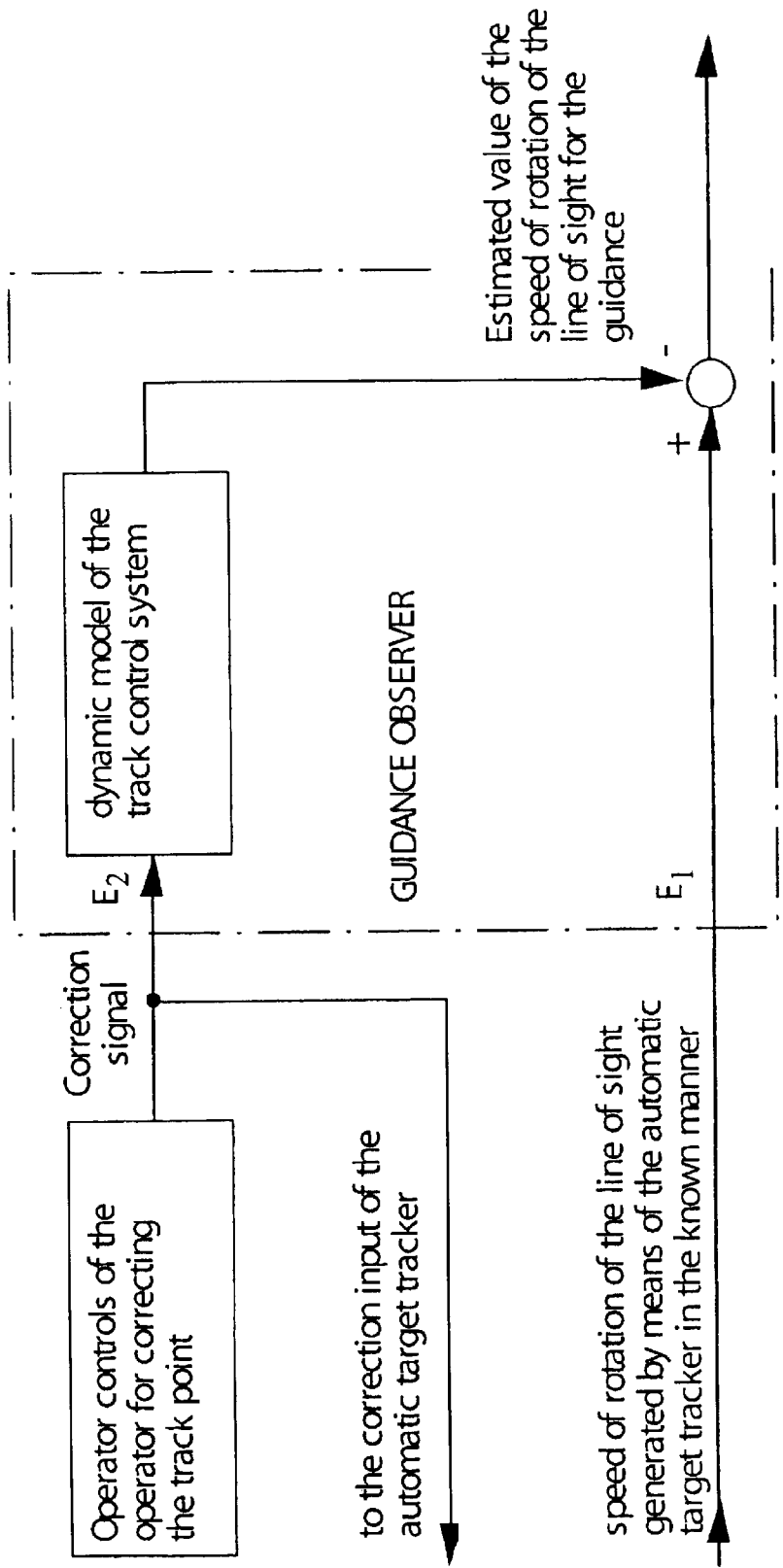
Figure 1: Guidance observer for estimating the speed of rotation of the line of sight for guidance with manually corrigible target trackers.

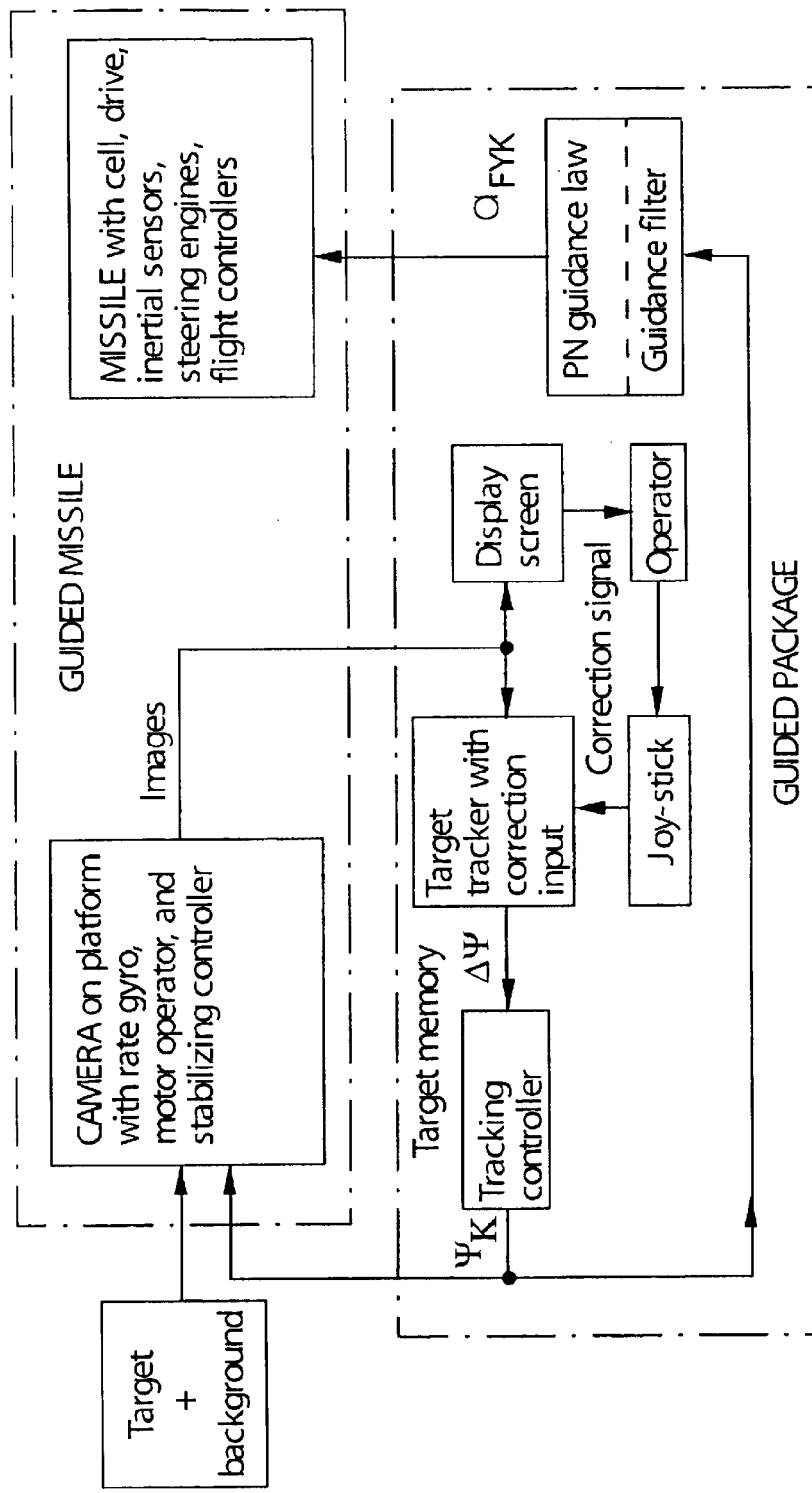
Figure 2a: Block diagram of a guided missile system with automatic target tracker and with the additional correction of the track point by an operator.

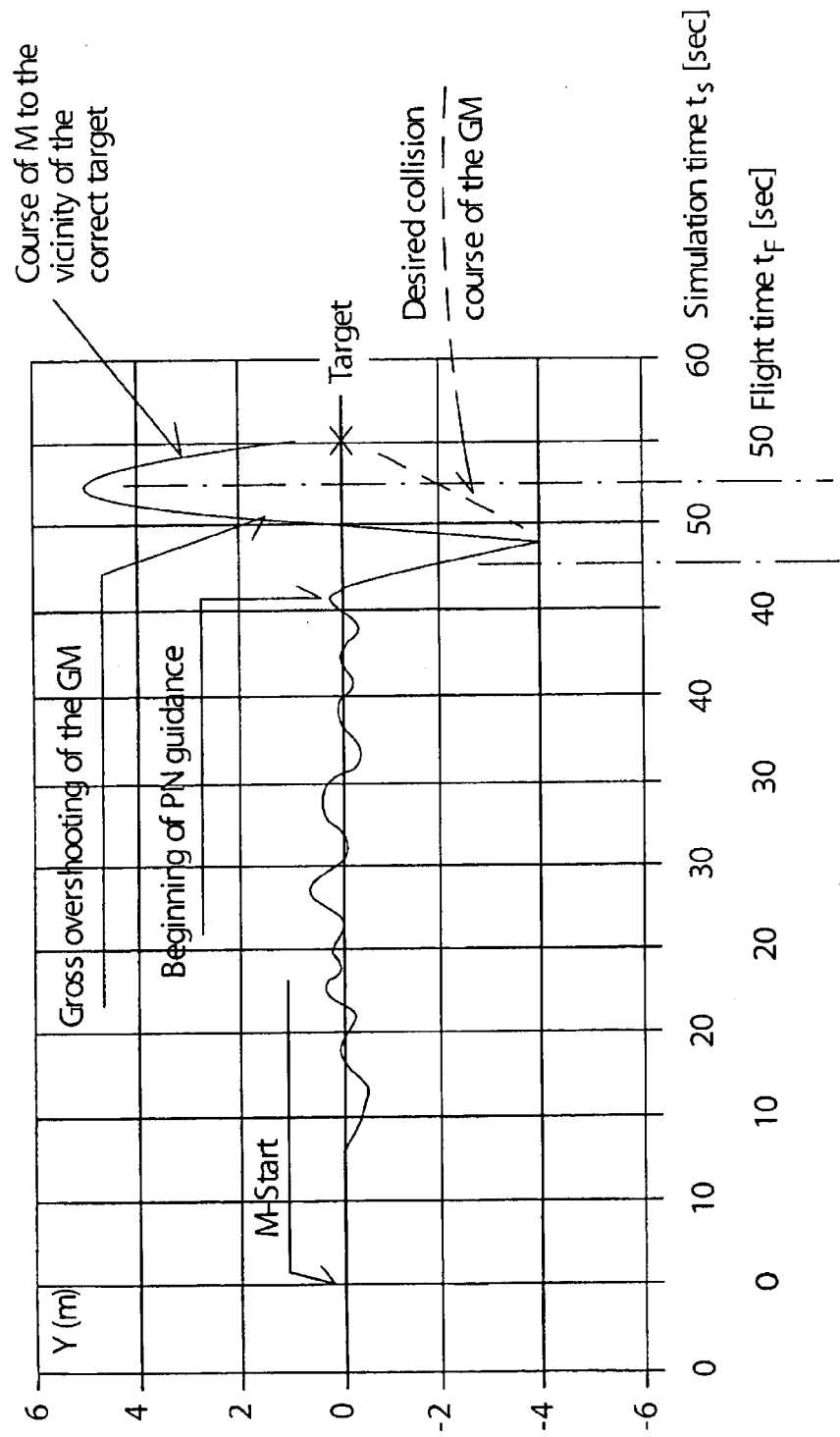
Figure 2b: Y Component of the M Path
The prior-art guidance according to Figure 2a guided the transverse movement of the GM.

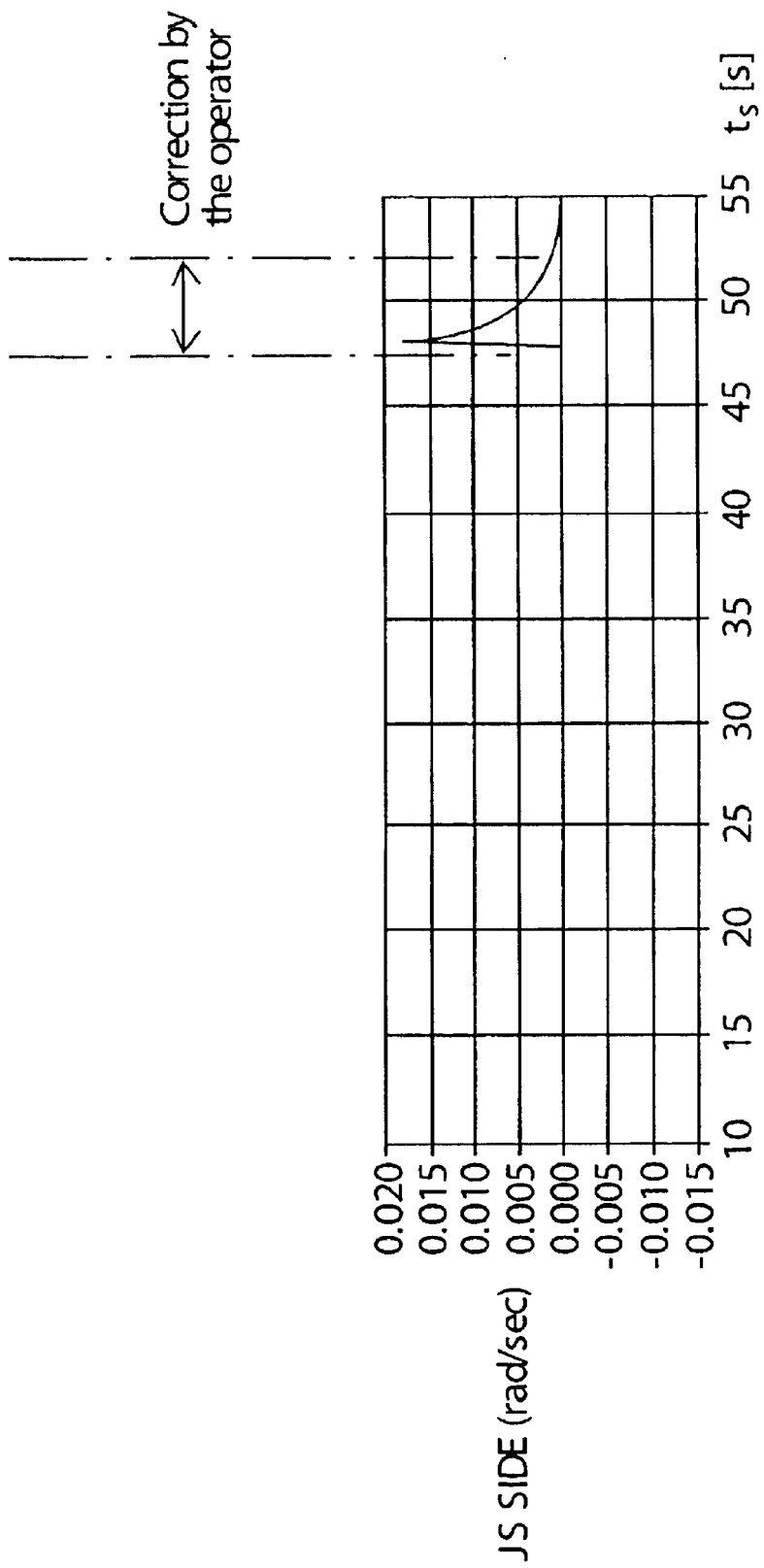
Figure 2c: Correction signal of the operator for track point correction

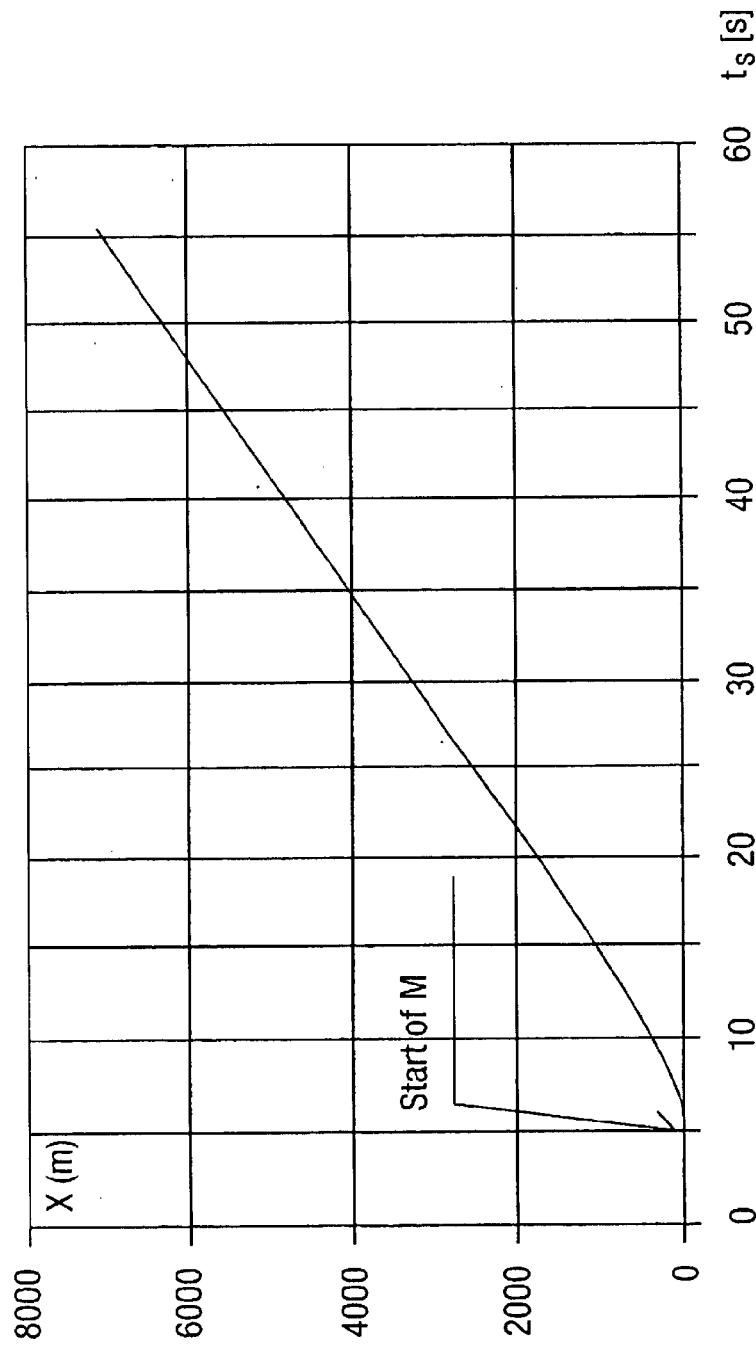
Figure 2d: X Component of the M Path
It is determined mainly by the time-path profile of the GM.

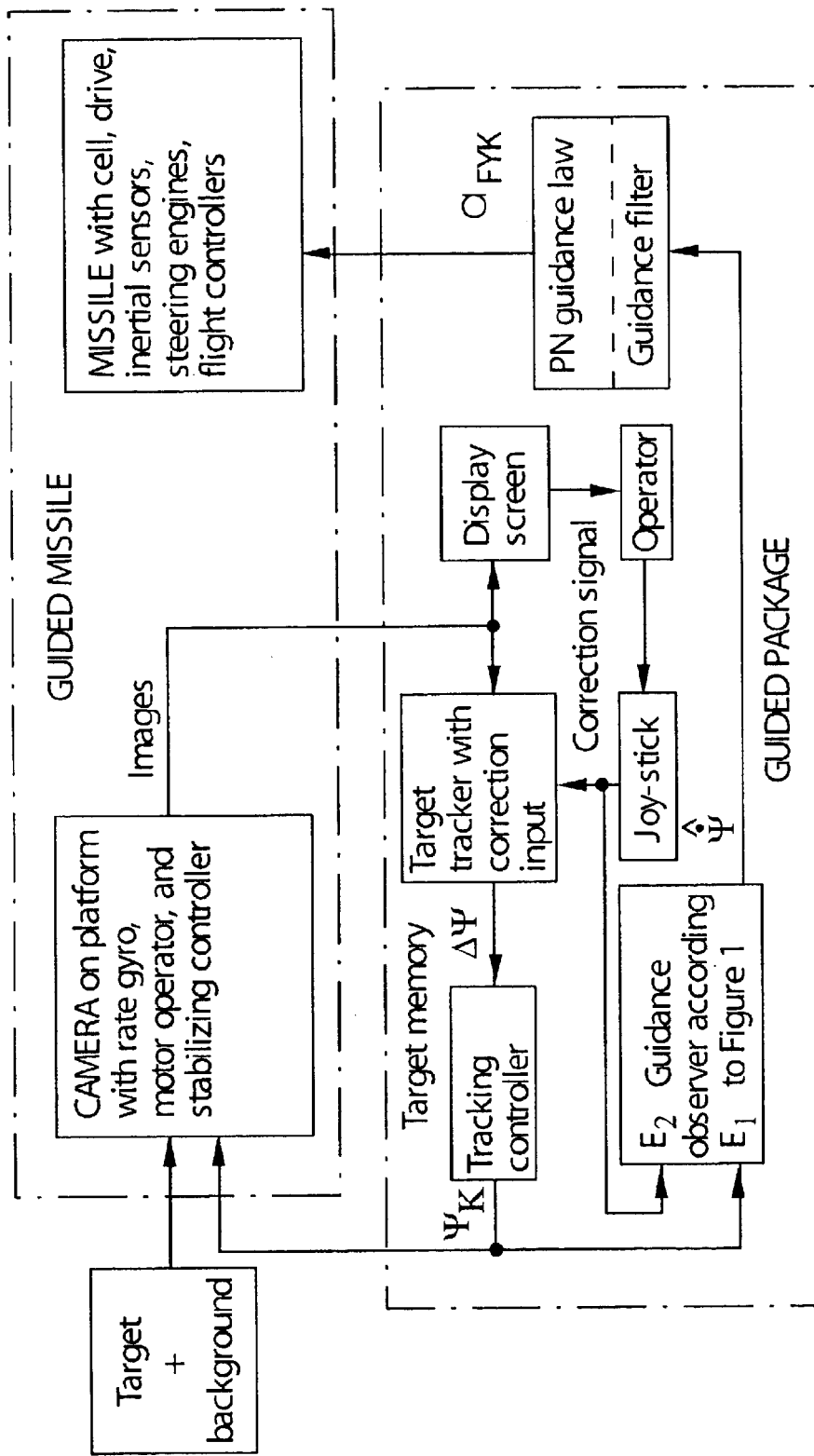
Figure 3a: Example of the application of the present invention to the guided missile system according to Figure 2a.

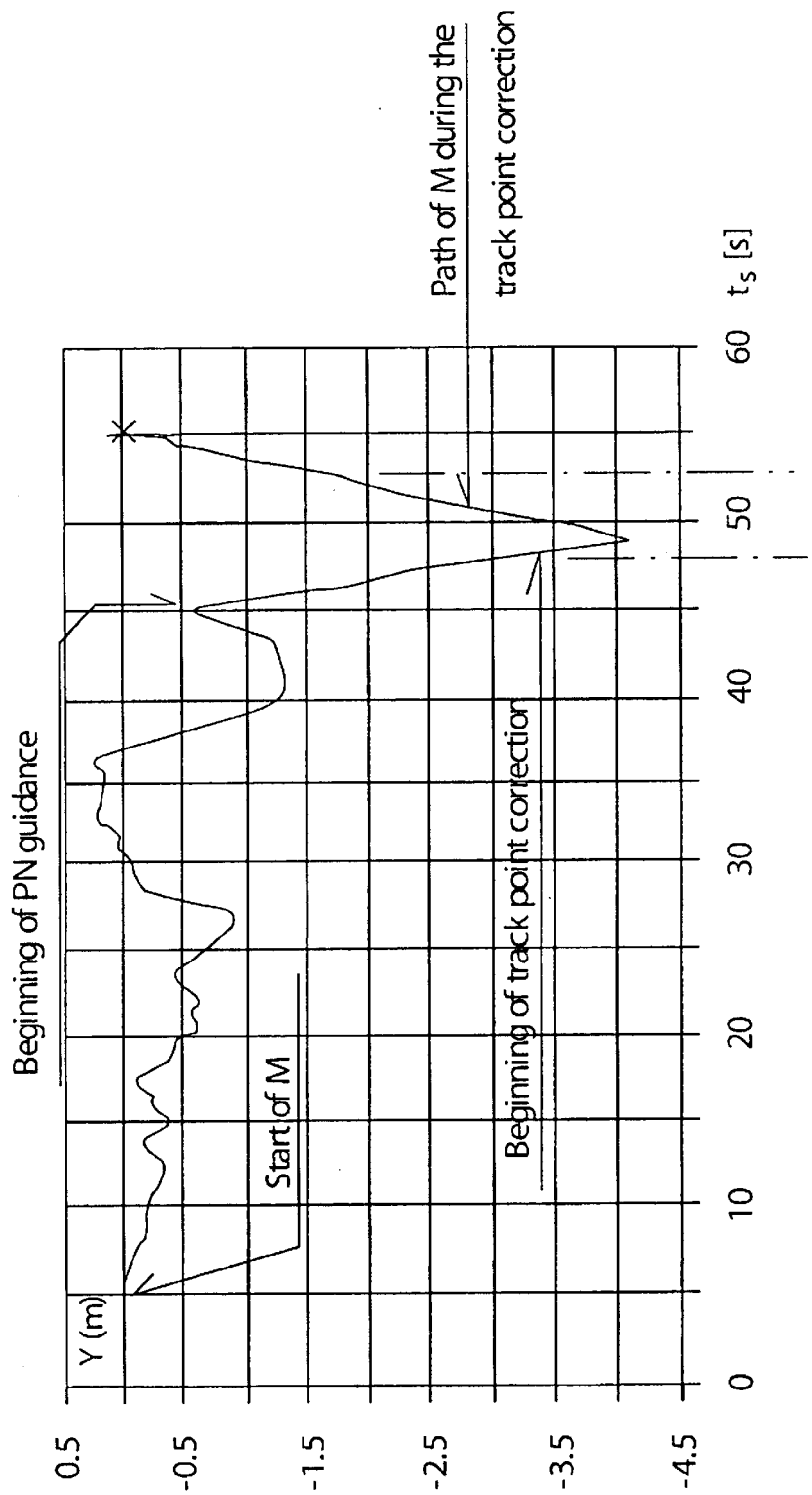
Figure 3b: Y Component of the M Path with the guidance according to the present invention as shown in Figure 3a. The transverse movement of the GM is better guided by the guidance than in the prior-art result in Figure 2c.

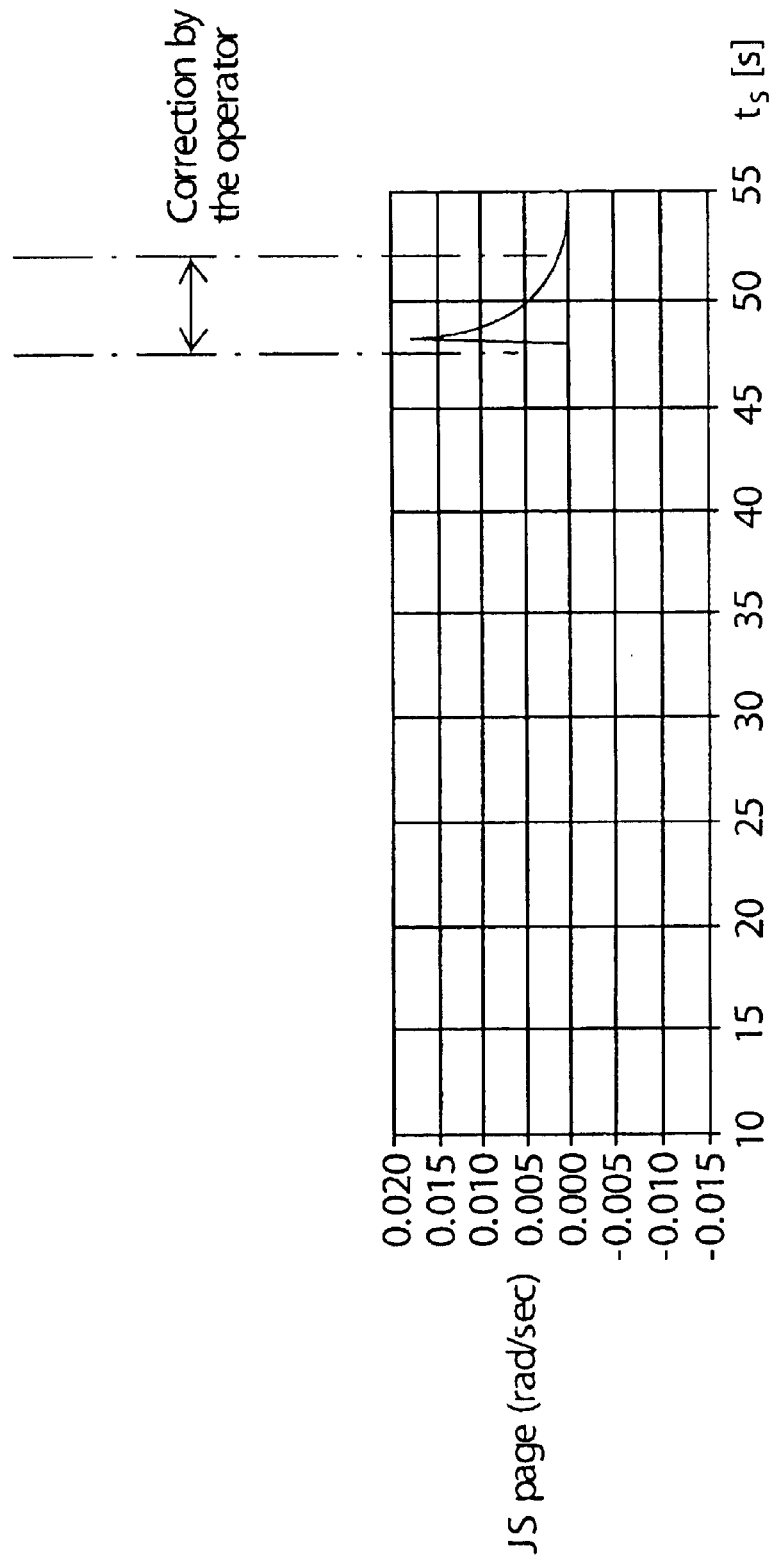
Figure 3c: Correction signal of the operator for track point correction

GUIDANCE FOR MISSILE SYSTEMS WITH TARGET TRACKER AND ADDITIONAL MANUAL TRACK POINT CORRECTION

FIELD OF THE INVENTION

The present invention pertains to guidance methods, in which missiles are guided by the use of automatic target trackers, which are additionally manually corrected by an operator based on guidance laws, in which an essential portion of the guidance command is formed from the speed of rotation of the line of sight from the tracker to the target. The estimated value of the speed of rotation for the guidance is improved by the subject of the present invention.

BACKGROUND OF THE INVENTION

The essential portion of the guidance command is formed in the guidance laws of the PN family from the speed of rotation of the line of sight between the missile (M) and the target. To do so, the speed of rotation of the target line of sight is provided by a homing head, which automatically tracks the target. Equation (1) describes this prior-art guidance law for guidance based on the transverse acceleration in the yawing plane:

$$a_{FYK} = \frac{V_A \cdot \Lambda}{\cos(\psi_F - \psi)} \cdot \dot\psi \quad (1)$$

in which $a_{FYK}$=transverse acceleration command to the M in the yawing plane, $V_A$=velocity of approach between the M and the target, $\Lambda$=navigation constant, -$(\psi_F - \psi)$ =swiveling angle of the homing head in relation to the longitudinal axis of the M, and $\dot\psi$=speed of rotation of the line of sight between the M and the target.

The most important variable for calculating the guidance command $a_{FYK}$ is the speed of rotation $\dot\psi$. Its quality substantially affects the hitting performance of the guided missile (GM). Variables containing errors in the term $V_A \cdot \Lambda$/cos $(\psi_F-\psi)$ have a substantially weaker effect on the hitting performance of the GM. Other terms of the guidance law, e.g., the compensation of the effect of the longitudinal acceleration of the M, are known and cause no change in the dominance of the speed of rotation of the line of sight with respect to the smallest possible error of hit of the GM.

An essential part of the guidance command, namely, the feed-forward term, is also formed from the speed of rotation and the angular acceleration of the line of sight to the target in the guidance laws of the LOSG (line-of-sight) guidance family. The speed of rotation of the line of sight is generated and made available for the guidance by a tracker, which in this case, automatically tracks the target as well. The angular acceleration can be formed in LOSG by a numerical differentiation and filtration from the speed of rotation provided.

The following considerations equally pertain to guidance systems with automatic target trackers in the guidance package or in the missile (homing heads). Trackers, which make possible a manual correction of the track point by an operator, are presupposed in both cases.

SUMMARY AND OBJECTS OF THE INVENTION

The primary object of the present invention is to guide the missile even during the track point corrections, possibly without overshooting and without delay. This means, e.g., that the collision course to the corrected track point is reached in the case of PN guidance rapidly and without overshooting, and that the GM is guided to the desired, corrected line of sight directly and without overshooting in the case of the line-of-sight guidance.

As a result, small hitting errors will be obtained even in the case of unsteady correction behavior of the operator and in the case of track point corrections shortly before the hit.

This object is accomplished according to the present invention by the following idea. The speed of rotation of the line of sight, which is formed by means of a target tracker in the known manner, is corrected by a variable that is derived from the correction signal of the operator for shifting the track point such that the components caused by apparent target maneuvers are compensated as a consequence of the correction. This corrected speed of rotation of the line of sight is used to form the guidance command in the known manner.

The estimated value of the rotation speed of the line of sight is formed for guidance in a freely programmable digital computer. The target tracker can include either an IR camera, a daylight camera, a radar sensor, a sound wave locating device or any similar tracking device. The target tracker, or one or more of its sensors, can be included in the projectile, or the target tracker can be located outside the projectile.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a flow chart of the guidance observer for estimating the speed of rotation of the line of sight for guidance with manually correctable target trackers;

FIG. 2a: is a block diagram of a guided missile system with an automatic target tracker and with additional correction of the track point by an operator;

FIG. 2b is a graph of the Y component of the missile path that is determined mainly by the guidance;

FIG. 2c is a graph of the correction signal of the operator to correct the track point;

FIG. 2d is a graph of the X component of the missile path that is determined mainly by the time-path profile of the GM;

FIG. 3a is a block diagram of the application of the present invention to the guided missile system according to FIG. 2a;

FIG. 3b is a graph of the Y component of the missile path that is determined mainly by the present invention as shown in FIG. 3a;

FIG. 3c is a graph of the correction signal of the operator to correct the track point by the present invention as shown in FIG. 3a.

DESCRIPTION OF THE PREFERRED EMBODIMENT

Referring to the drawings, the correction of the speed of rotation of the line of sight is performed in a guidance observer according to FIG. 1. The correction signal of the operator is fed into a dynamic model of the track control circuit. The output variable of this circuit is subtracted from the speed of rotation of the line of sight formed by means of a target tracker in the known manner. The result is the estimated value of the speed of rotation of the line of sight for the guidance.

FIG. 2a shows an example of the prior-art guidance process according to proportional navigation for the yawing plane of a GM. It was additionally expanded by the three function blocks "Display screen, Operator, Joystick" and by the "Correction input" of the target tracker for the track point correction.

A camera is mounted on a stabilized platform in the front part of the GM. The optical axis of the camera is continuously directed toward the target by a tracking control circuit. This tracking control circuit is closed via the automatically operating parts "image-processing target tracker" and "tracking controller" in the guidance package. The images and the tracking commands $\psi$ are transmitted for this purpose via, e.g., an optical waveguide.

After filtration, the transverse acceleration command $a_{FYK}$ is formed for the GM from the tracking command $\psi$ based on the guidance law and is transmitted to the GM.

The operator observes the scene on the display screen, on which the current track point of the automatic image processing is also indicated by a mark (e.g., hair cross). The operator is able to continuously correct the track point by means of the joystick.

FIG. 3a shows the application of the present invention in a guidance process according to proportional navigation. The above-described FIG. 2a has been expanded by the guidance observer according to the present invention.

To illustrate the advantage of the present invention in a case of application, simulations were performed with both the prior-art guidance process according to FIG. 2a and the additional guidance observer according to the present invention corresponding to FIG. 3a.

The movement of the guided missile was described in the simulation in a rectangular system of coordinates, whose origin is located at the start point of the M. The fighting of an immobile target having the coordinates $X_z$=7,000 m
$Y_z$=0
$Z_z$=0 was simulated.

The results are recorded in FIGS. 2b through 2d over the simulation time $t_s$ for the prior-art guidance according to FIG. 2a:

The M was started in the pre-reconnoitered direction of the target at the time $t_s$=5 sec. On a pre-planned path, the GM was automatically guided into the proximity of the target. The operator observed the images of the M camera on the display screen and after a flight time of about 35 sec, at a distance of about 2,200 m between the M and the target, he discovered an apparent target, which was located about $Y_{sz}$=−20 m next to the real target. The target tracker was directed by the operator to this false target. Beginning from a flight time of 37 sec, the apparent target was automatically tracked by the track control circuit of the homing head, while the missile was continued to be automatically guided on the preplanned path.

The final guidance according to proportional navigation corresponding to the block diagram 2a was activated by the operator after a flight time of about 40 sec, and the missile was automatically guided to a collision course with the apparent target at $Y_{SZ}$=−20 m.

After a flight time of 43 sec, the operator detected that the target to be actually fought was at a distance of about 1,000 m from the target, and he immediately began correcting the track point. The corresponding command from the output of the joystick is shown in FIG. 2c. The correction by the operator was concluded after a flight time of about 47 sec. The tracking control circuit of the homing head and the PN guidance continued to operate during the correction.

As can be clearly seen in FIG. 2b, the GM grossly overshoots during the track point correction and is initially guided to an incorrect course that would lead to a collision with a target at the position of about $Y_{z^*}$=+18 m. The GM is guided to the correct collision point at $Y_z$=0 only beginning from the end of the correction after a flight time of about 47 sec. The hit error is about 1 m after a flight time of about 50 sec.

The results of the simulation for the guidance system according to FIG. 3a with the guidance observer according to the present invention are shown in FIGS. 3b and 3c for the same mission conditions. The Y component of the M path is shown in FIG. 3b over the simulation time. The effectiveness of the present invention can be clearly recognized here. The GM is guided directly to the collision course with the target at $Y_z$=0 at the beginning of the track point correction at a flight time of about 43 sec. The undesired overshooting occurring with the prior-art guidance in FIG. 2b is eliminated by the present invention. The hit error is 0.1 m after a flight time of about 50 sec.

Very good hitting performance is achieved due to the introduction of the guidance observer according to FIG. 3a even in the case of track point corrections with an unsteady operator, because the guidance will no longer cause overshooting.

The features described in the abstract, the patent claims, the description and those features presented in the drawing can prove essential both singly and in arbitrary combinations to the realization of the invention.

While specific embodiments of the invention have been shown and described in detail to illustrate the application of the principles of the invention, it will be understood that the invention may be embodied otherwise without departing from such principles.

What is claimed is:

1. A guidance method for guidance systems, the method comprising the steps of:

forming a target track point with a target tracker;

correcting said track point with a manual correction signal;

generating a speed of rotation of the line of sight with the target tracker;

providing a track control system dynamic model;

forming an estimated value for the rotation speed of the line of sight from said speed of rotation of the line of sight generated with the target tracker corrected with a correction value generated with said dynamic model of the track control circuit based on said manual correction signal; and using the estimated value of the speed of rotation of the line of sight for guidance.

2. A method in accordance with claim 1, wherein:

said estimated value of said rotation speed of said line of sight is formed for guidance in a freely programmable digital computer.

3. A method in accordance with claim 2, wherein:

said target tracker includes one of an IR camera, a daylight camera, a radar sensor, and a sound wave sensor.

4. A method in accordance with claim 2, wherein:

the guidance system includes a projectile;

said target tracker is included in said projectile.

5. A method in accordance with claim 2, wherein:
the guidance system includes a projectile;
said target tracker includes a sensor and said sensor is included in said projectile.

6. A method in accordance with claim 2, wherein:
the guidance system includes a projectile;
said target tracker is located outside the projectile.

7. A method in accordance with claim 1, wherein:
said target tracker includes one of an IR camera, a daylight camera, a radar sensor, and a sound wave sensor.

8. A method in accordance with claim 7, wherein:
the guidance system includes a projectile;
said target tracker is included in said projectile.

9. A method in accordance with claim 7, wherein:
the guidance system includes a projectile;
said target tracker includes a sensor and said sensor is included in said projectile.

10. A method in accordance with claim 7, wherein:
the guidance system includes a projectile;
said target tracker is located outside the projectile.

11. A method in accordance with claim 1, wherein:
the guidance system includes a projectile;
said target tracker is included in said projectile.

12. A method in accordance with claim 1, wherein:
the guidance system includes a projectile;
said target tracker includes a sensor and said sensor is included in said projectile.

13. A method in accordance with claim 1, wherein:
the guidance system includes a projectile;
said target tracker is located outside the projectile.

14. A guidance system method, the method comprising the steps of:
forming a target track point with a target tracker, the track point representing the location of the apparent target;
correcting said track point with a manual correction signal based on the real target being at a location different from the apparent target;
generating a speed of rotation of a line of sight with the target tracker;
providing a guidance observer with a track control system dynamic model;
forming a rotation of line of sight correction signal from said manual correction signal using said track control system dynamic model;
using the guidance observer to form an estimated value for a rotation speed of said line of sight from said speed of rotation of a line of sight generated with the target tracker corrected with said rotation of line of sight correction signal; and
using the estimated value of the speed of rotation of the line of sight for guidance.

* * * * *